3,098,050
BUILDING MATERIAL COMPOSITIONS FOR THE MANUFACTURE OF WATER REPELLENT MASONRY
Walter Noll, Leverkusen-Bayerwerk, and Klaus Damm and Helmut Weissbach, Opladen, Germany, assignors to Farbenfabriken Bayer Aktiengesellschaft, Leverkusen, Germany, a corporation of Germany
No Drawing. Filed Oct. 31, 1958, Ser. No. 771,160
Claims priority, application Germany Nov. 8, 1957
6 Claims. (Cl. 260—18)

The present invention relates to building material compositions for the manufacture of water repellent masonry.

It is known to impart water-repellent properties to porous masonry for protection with the aid of alkyl-silicon compounds. The only customary mode of application of these compounds in building industry has hitherto been the impregnation of the completely shaped stone masses with liquids; these are either aqueous solutions of alkali metal-alkyl siliconates or solutions of organo-polysiloxanes in organic solvents. However, impregnations of this type have disadvantages: the solutions have to be applied to the surfaces to be treated when these are dry; this requires in some cases waiting periods of several weeks. The full effect of the impregnating agent is achieved only after the siloxanes have deposited as solids with evaporation of the solvent or reaction with atmospheric carbon dioxide or lime, i.e. after the lapse of more time. When using organic solvents, the solutions are inflammable or toxic; also the siliconate solutions, being strongly alkaline, require particular care in order to protect workers from injury, and also to protect wooden, lacquered, metal or glass objects from corrosion.

With impregnation, unevenness must also, in principle, be taken into account, partly because the amount applied is not evenly distributed on the surface even by carefully working, partly because the surfaces themselves unevenly absorb the applied liquid. In any case the impregnation is limited to an external layer penetrating only a few millimetres. If this layer is destroyed, the underlying material is no longer protected.

It is obvious and has already been proposed, in order to save the working step of a subsequent impregnation and to obtain a satisfactory distribution of the alkali metal-alkyl siliconates, to use them dissolved in the mixing water of the mortar; however, this does not reduce the number of disadvantages: the setting time and strength of the building elements, particularly those containing cement, are unfavourably influenced. Facing plasters, for example, do not adhere sufficiently fast to the foundation. During the setting time, the siliconates are still partially dissolved and therefore liable to be washed out by the external influence of water. They give rise to white efflorescences which are rooted in the building material and can therefore not be rubbed off so that disturbing stains are formed, particularly on coloured plaster.

The aforesaid disadvantages are obviated according to the invention by admixing to the still unshaped building materials, particularly to the dry binding agents, alkyl-polysiloxanes in a solid and so finely divided state that the grain size is less than 1 micron. These alkyl-polysiloxanes are products of hydrolysis and condensation of liquid alkyl-halo-silanes and halo-silane mixtures containing alkyl-halo-silane which are known to give solid siloxane products by rapid hydrolysis and spontaneous condensation and which are obtainable immediately in a finely divided state according to a method of hydrolysis described in copending application Ser. No. 768,706, entitled Process for the Production of Finely Divided Solid Hydrolysis Products of Organosilanes, filed in the name of Klaus Damm, Karl Schnurrbusch, Walter Oetke, Rudolf Erdmenger and Kurt Stade, which application is assigned to the same assignee. This method of hydrolysis is carried out by finely spraying the liquid silane derivatives to be reacted with water by means known as such, and by allowing the droplets thus formed to fall through a reaction zone in which a water mist is produced simultaneously, likewise by spraying, the sprayed amount of water being a multiple of the stoichiometric amount required for the complete hydrolysis of the silane liquid sprayed simultaneously, and the zone filled with water mist being sufficiently high for the hydrolysis and condensation of the silane falling down in individual droplets, to be completed during the stay in said zone. The products collected at the bottom of the reaction chamber yield, after washing and drying, the alkyl-polysiloxanes to be used according to the invention as additives to building materials.

For obtaining them according to the above mentioned process, there is a choice between a number of halo-silane liquids. They are monoalkyl-trihalosilane and mixtures thereof with smaller amounts of alkyl-halo-silane richer in hydrocarbon such as dialkyl-halo-silane, trialkyl-halo-silane; furthermore mixtures of silicon-tetrahalide and methyl-halo-silanes, the amounts being chosen in each case in a manner known as such so that the hydrolysis products are not oily or sticky-resinous, but solid and hard; when carrying out the hydrolytic reaction according to the above mentioned process, loose, flour-like powders are obtained. Thus, in the case of silicon tetrachloride and trimethyl-monochlorosilane, not more than two mols of $(CH_3)_3SiCl$, preferably between 0.05 and 0.5 mols, should be used per mol of $SiCl_4$. The advantage of using silicon tetrachloride consists in saving the more expensive silicon organic components.

It is to be understood that all alkyl radicals which are known to promote hydrophobic character in alkyl-poly-siloxanes can be used within the scope of the invention.

The proportions of alkyl-polysiloxane additives are to be chosen between 0.1 and 5 percent by weight of dry building material composition.

The building materials themselves comprise mortars of all types, particularly plaster mortar for facing plaster, light and heavy concrete masses, asbestos cement, magnesia cement masses, masses containing gypsum or anhydrite, and masses for the manufacture of artificial stones provided their baking or hardening temperatures do not exceed 300° C. The setting time and solidity of the element shaped therefrom are not noticeably influenced by additions of the above mentioned amounts. During the mixing with the building material care has to be taken by usual means for an even distribution. On account of the physiological inertia of alkyl polysiloxanes additional precautions are unnecessary. The dry mixtures containing the additive according to the invention are at least as stable on storage as dry mixtures not containing this additive; the mixing with water to prepare mouldable masses encounters no difficulty, i.e. during working up in the manner customary in building industry no wetting inhibitions or supernatation of the hydrophobic component were noticed.

In the further development of the herein described building material composition it has been found that the efficiency of the alkyl-polysiloxane powder is increased so that the proportion of the alkyl-polysiloxane powder in the building material composition can be substantially reduced if the alkyl-polysiloxane powder is previously admixed with another finely divided powder which does not deleteriously affect the properties of the building material composition. For this purpose there may be used e.g. the powder of any of the components of the building material composition. In particular there may be used as blending component cement, lime, sand, pigments, chalk, talcum, kieselguhr, and finely divided silica, furthermore organic compounds, such as aluminum stearate, calcium stearate and other salts of higher carboxylic acids. These blending components are to be used according to the invention in a state of fine division, but they need not be so finely divided as the alkyl-polysiloxanes to be admixed therewith.

The proportion of the powder to be added to the alkyl-polysiloxanes as blending component may vary within wide limits, preferably between 20 and 90% by weight of the premixture, i.e. the blending component and the alkyl-polysiloxane. Premixing is carried out in a manner known per se by means of devices customarily employed in this art, preferably by means of a mill. The amount of the premixture to be added to the building material composition depends on the proportion of alkyl-polysiloxane in the premixture; it is to be chosen so that the entire amount of the dry building material composition contains between about 0.1 and 5% by weight of alkyl-polysiloxanes.

The following examples are given for the purpose of illustrating the invention.

*Examples*

Three silane liquids were subjected to hydrolysis according to the process described above:

(1) Methyl-trichlorosilane,
(2) A mixture of 97 percent by weight of silicon tetrachloride and 3 percent by weight of trimethylchlorosilane,
(3) A mixture of 70 percent by weight of silicon tetrachloride and 30 percent by weight of methyl-trichlorosilane.

The methyl-polysiloxanes thus obtained had a specific surface of between 40 and 60 sq. metres per gram and a primary particle size of less than 1 micron. They were individually used for the building material compositions described below.

Plaster mortar from 1000 g. of sand (grain size below 5 millimeters), 67 g. of Portland cement, 67 g. of dolomite quicklime, 12 g. of iron oxide pigment and about 200 g. of water, was treated with 5 g. each time of one of the methyl-polysiloxanes described above. Each of the three mortars was applied to moistened bricks, and after setting, gave a plaster whose solidity and adhesiveness to the brick were equal to those of a plaster of the same composition, but without the addition of methyl-polysiloxane. Water brought onto the three plaster layers prepared according to the invention, did not wet them, but was completely repelled.

The same results were obtained with pigment-containing lime-cement suspension coatings from Portland cement and white lime in various proportions containing about 2 percent by weight of dry substance of one of the three types of methyl-polysiloxane described above. The same is true of suspension coatings from lime only with the addition of 4 percent by weight of one of the said methyl-polysiloxanes.

From the first-mentioned plaster-mortar composition with methyl-polysiloxane obtained from methyl trichlorosilane there were cast cylindrical bodies of 5 centimetres' diameter and 2 centimetres' height. After storing at room temperature for 11 days, these test bodies were placed into water so that the latter stood 5 centimetres above the upper edge of the test bodies. Their water absorption was measured after 2, 7 and 24 hours with 7.1, 7.8 and 9.1 percent of their weight. In contrast to this, comparative control bodies prepared without the hydrophobing methyl-siloxane additive but otherwise in the same manner, shows a water absorption of 14.5, 14.7 and 14.9 percent by weight.

The following examples are given for the purpose of illustrating the invention when using premixtures as described above.

A plaster-mortar of 1000 g. of sand (grain size below 5 millimetres), 67 g. of Portland cement and 67 g. of dolomite quicklime was admixed with the additives given in the table below, a hydrolysis product of methyl-trichlorosilane described above being used. Each of the mixtures thus obtained was stirred with 200 g. of water and then molded into cylindrical bodies of 5 centimetres' diameter and 1 centimetre height. These test bodies were dried by storing them in the air for 5 days and then placed into water so that the water stood 5 centimetres above the upper edge of the test bodies. After the various periods indicated in the table, the test bodies were removed from the water and weighed. The parts by weight of water absorbed by 100 parts by weight each of the dry test bodies are given in the table.

| Premixture | | | Percent by weight of the premixture in the dry mortar | Percent by weight of methyl-polysiloxane in the dry mortar | Increase in weight in percent of the test bodies placed in water for— | | |
|---|---|---|---|---|---|---|---|
| Percent by weight of methyl-poly-siloxane | Percent by weight of the blending component | | | | 2h. | 7h. | 24h. |
| 0 | 0 | | 0 | 0 | 10 | 10 | 11 |
| 100 | 0 | | | 0.3 | 7.3 | 9.1 | 9.8 |
|  |  |  |  | 0.4 | 1.2 | 2.5 | 5.6 |
|  |  |  |  | 0.5 | 0.7 | 1.7 | 2.8 |
| 20 | 80 | finely divided silica. | 1.5 | 0.3 | 1.9 | 5.1 | 9.6 |
|  |  |  | 2.0 | 0.4 | 0.5 | 0.7 | 1.4 |
|  |  |  | 2.5 | 0.5 | 0.7 | 0.7 | 1.5 |
| 20 | 80 | talcum (ground) | 1.5 | 0.3 | 1.6 | 4.2 | 7.0 |
|  |  |  | 2.0 | 0.4 | 0.4 | 0.7 | 1.7 |
|  |  |  | 2.5 | 0.5 | 0.4 | 0.6 | 1.4 |
| 20 | 80 | Chalk | 1.5 | 0.3 | 1.6 | 4.2 | 7.0 |
|  |  |  | 2.0 | 0.4 | 0.4 | 0.7 | 1.7 |
|  |  |  | 2.5 | 0.5 | 0.4 | 0.6 | 1.4 |
| 50 | 50 | Al-stearate | 0.5 | 0.25 | 0.8 | 0.9 | 2.7 |
|  |  |  | 0.6 | 0.3 | 1.0 | 1.8 | 3.2 |
|  |  |  | 0.8 | 0.4 | 1.0 | 1.6 | 3.3 |
| 50 | 50 | Ca-stearate | 0.5 | 0.25 | 3.2 | 4.3 | 6.1 |
|  |  |  | 0.6 | 0.3 | 1.0 | 1.5 | 3.0 |
|  |  |  | 0.8 | 0.4 | 0.7 | 1.4 | 2.6 |
| 0 | 100 | Al-stearate | 0.6 | 0 | 9.5 | 9.5 | 10.3 |
|  |  |  | 0.8 | 0 | 4.2 | 5.3 | 6.3 |
|  |  |  | 1.0 | 0 | 3.4 | 4.2 | 5.0 |
| 0 | 100 | Ca-stearate | 0.6 | 0 | 5.1 | 6.1 | 7.7 |
|  |  |  | 0.8 | 0 | 4.3 | 4.9 | 6.2 |
|  |  |  | 1.0 | 0 | 3.2 | 3.5 | 3.9 |

We claim:
1. A composition for making water-repellent masonry, which comprises a dry intimate mixture of a member selected from the group consisting of plaster mortars, concrete, asbestos cement, magnesia cement, gypsum and anhydrite and a methyl polysiloxane powder insol- uble in water having a grain size of below 1µ, the weight of said methyl polysiloxane being from 0.1 to 5% of the weight of the entire composition.

2. A composition for making water-repellent masonry, which comprises a dry intimate mixture of a member selected from the group consisting of plaster mortars, concrete, asbestos cement, magnesia cement, gypsum and anhydrite and a methyl polysiloxane powder insoluble in water having a grain size of below 1µ, the weight of said methyl polysiloxane being from 0.1 to 5% of the weight of the entire composition, said methyl polysiloxane powder having been prepared by contacting sprayed water with finely sprayed methyl-trihalosilane.

3. A composition for making water-repellent masonry, which comprises a dry intimate mixture of a member selected from the group consisting of plaster mortars, concrete, asbestos cement, magnesia cement, gypsum and anhydrite and a methyl polysiloxane powder insoluble in water having a grain size of below 1µ, the weight of said methyl polysiloxane being from 0.1 to 5% of the weight of the entire composition, said methyl polysiloxane powder having been prepared by contacting sprayed water with a finely sprayed liquid mixture of silicon tetrahalide and a methyl halosilane.

4. Process for preparing water-repellent masonry compositions comprising adding a methyl polysiloxane powder having a grain size of below 1µ to a member selected from the group consisting of plaster mortars, concrete, asbestos cement, magnesia cement, gypsum and anhydrite in an amount whereby the weight of said methyl polysiloxane powder is from 0.1 to 5% of the weight of the resulting dry composition, and preparing an intimate mixture of said methyl polysiloxane powder and group member.

5. Process for preparing water-repellent masonry compositions comprising adding a methyl polysiloxane powder having a grain size of below 1µ to an inert, finely divided blending substance in a proportion of from 10 to 80 parts by weight of said methyl polysiloxane powder per 100 parts by weight of the resulting dry mixture, preparing an intimate mixture of said methyl polysiloxane powder and inert, finely divided blending substance, thereafter adding said mixture to a member selected from the group consisting of plaster mortars, concrete, asbestos cement, magnesia cement, gypsum and anhydrite in an amount whereby the weight of said methyl polysiloxane powder is from 0.1 to 5% of the weight of the resulting dry composition, and preparing a mixture of said mixture of methyl polysiloxane and inert, finely divided blending substance and said group member.

6. Process according to claim 5 in which said inert blending substance is a member selected from the group consisting of cement, lime, sand, pigments, chalk, talcum, kieselguhr, finely divided silica, and salts of the higher carboxylic acids.

References Cited in the file of this patent
UNITED STATES PATENTS

| | | |
|---|---|---|
| 2,491,487 | Faulwetter | Dec. 20, 1949 |
| 2,676,091 | Barry et al. | Apr. 20, 1954 |
| 2,757,159 | Hormats | July 31, 1959 |

FOREIGN PATENTS

| | | |
|---|---|---|
| 782,111 | Great Britain | Sept. 4, 1957 |